United States Patent
Atkins

(10) Patent No.: US 7,149,369 B2
(45) Date of Patent: Dec. 12, 2006

(54) METHOD AND SYSTEM FOR IMAGE SCALING

(75) Inventor: C. Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 656 days.

(21) Appl. No.: 10/131,691

(22) Filed: Apr. 23, 2002

(65) Prior Publication Data

US 2003/0198399 A1 Oct. 23, 2003

(51) Int. Cl.
- G06K 9/32 (2006.01)
- G06K 9/40 (2006.01)
- G09G 5/00 (2006.01)
- G09G 5/02 (2006.01)
- H04N 5/44 (2006.01)
- H04N 9/74 (2006.01)
- H04N 3/323 (2006.01)
- G06K 9/48 (2006.01)
- H04N 1/393 (2006.01)
- G06F 7/00 (2006.01)
- G06F 15/00 (2006.01)

(52) U.S. Cl. .............. 382/299; 382/199; 382/260; 382/293; 345/660; 345/698; 348/561; 348/581; 348/704; 358/451; 708/208

(58) Field of Classification Search ............ 382/299, 382/298, 199, 260, 293, 300; 345/660–671, 345/698–699; 348/561, 581, 582, 704; 358/451; 708/208
See application file for complete search history.

(56) References Cited

U.S. PATENT DOCUMENTS

| | | | | |
|---|---|---|---|---|
| 4,896,364 A * | 1/1990 | Lohscheller | ............... | 382/162 |
| 5,131,057 A * | 7/1992 | Walowit et al. | ............ | 382/264 |
| 5,327,257 A * | 7/1994 | Hrytzak et al. | | |
| 5,351,305 A * | 9/1994 | Wood et al. | ............... | 382/128 |
| 5,406,334 A * | 4/1995 | Kondo et al. | | |
| 5,469,216 A * | 11/1995 | Takahashi et al. | .......... | 348/441 |
| 5,852,470 A * | 12/1998 | Kondo et al. | .............. | 348/448 |
| 5,917,963 A * | 6/1999 | Miyake | | |
| 5,953,465 A * | 9/1999 | Saotome | | |
| 6,058,248 A | 5/2000 | Atkins et al. | ............... | 358/1.2 |
| 6,075,926 A | 6/2000 | Atkins et al. | ............... | 358/1.2 |
| 6,175,659 B1 * | 1/2001 | Huang | ...................... | 382/266 |
| 6,281,875 B1 * | 8/2001 | Zhao et al. | | |
| 6,384,828 B1 * | 5/2002 | Arbeiter et al. | ......... | 345/472.2 |
| 6,400,413 B1 * | 6/2002 | Miyake | .................... | 348/581 |
| 6,519,368 B1 * | 2/2003 | Kondo et al. | .............. | 382/260 |
| 6,714,210 B1 * | 3/2004 | Yip et al. | ................. | 345/667 |
| 6,714,692 B1 * | 3/2004 | Kim et al. | ................. | 382/299 |
| 6,717,622 B1 * | 4/2004 | Lan | ............................ | 348/625 |
| 2001/0035969 A1 * | 11/2001 | Kishimoto | ................. | 358/1.9 |

* cited by examiner

Primary Examiner—Bhavesh M Mehta
Assistant Examiner—Manav Seth

(57) ABSTRACT

A method for image scaling. Specifically, one embodiment of the present invention discloses a method for image scaling that begins by selecting an input pixel from a first image. An input edge characteristic is determined from an input window associated with the input pixel. The input edge characteristic is determined from a plurality of predetermined edge characteristics that are associated with sets of filter coefficient vectors. An output window is generated by filtering the input window with a corresponding set of filter coefficients associated with the input edge characteristic. An output image is generated by repeating the above for a plurality of input pixels associated with the first image.

43 Claims, 10 Drawing Sheets

METHOD AND SYSTEM FOR IMAGE SCALING

TECHNICAL FIELD

The present invention relates to the field of image scaling.

BACKGROUND ART

For many computer process applications, it is necessary to scale input data of lower resolution into output data of higher resolution in order to achieve acceptable, usable, or improved results.

Representative data often presents a low resolution input data set that is a poor replication of the original source. The data presents something much less than a true-life rendering. Many types of source data can benefit by data resolution enhancement: computer image data, digital or analog video data, geographic data measured on a regular grid, vector field data, speech synthesis signals data, and the like.

As to more specific examples in the field of image processing, such as, digital scanning, dot matrix printing, digital camera to video display conversion, digital photography, Internet provider data, JPEG computer image standards, CDROM, magnetic resonance imaging, interframe interpolation for analog video, and the like, the source of the imaging data often provides graphical image data (including bit mapped alphanumeric text images) which is of a relatively low resolution. The term "graphics" as used herein shall be understood to be generic for all forms of imaging. Therefore, output renderings made directly from the source data may be of a low quality.

Moreover, source images, such as, JPEG photographs, Internet files, are often compressed using relatively high data loss compression algorithms to reduce memory storage requirements for the providers. In some cases, decompression algorithms applied when the data is retrieved from memory essentially interpolate the reduced data using simple linear interpolation techniques that lack the precision necessary to reproduce the original image.

For example, in color printing, such as with laser or ink-jet dot matrix hard copy apparatus, resolution enhancement may be necessary to create a print with higher resolution in order to provide a sharper, less blocky, and smoother textured image. In another case, resolution enhancement may be necessary to zoom in and crop a video image before printing, or merely to enhance a particular detail within the original image.

Some prior image scaling techniques provide resolution enhancement through linear filtering approaches. These approaches tend to be less computationally intensive by averaging pixel values across a particular direction. A particular drawback to linear filtering is that sharp edges in the higher resolution image appear blurry and blocky. Previously, the linear filtering approaches were not able to distinguish between sharp edge regions and smooth transition regions to adapt their processing in or around the regions containing sharp edges.

For example, B-spline interpolators, such as image picture element ("pixel") replication and bilinear interpolation, are well known in the art. The technique of B-spline interpolation specifies an interpolating function which approximates the original image by sampling across a range of the source image data. The interpolating function is defined on a continuous-valued parameter and may be evaluated at arbitrary points. The resulting values comprise the interpolated image pixels. However, a major drawback to B-spline interpolation is the amount of computation needed before recovering the desired output samples, which increases the complexity and cost of B-spline interpolation techniques, especially for higher orders of B-spline interpolation techniques, such as cubic B-spline interpolations. Moreover, B-spline interpolation techniques still suffer from blurring around sharp edges in the higher resolution image.

In particular, both pixel replication and bilinear interpolation perform satisfactorily for interpolating smooth textures. However, these single linear filter approaches tend to average image data across high-contrast boundaries like edges and rapid contrast change zones, causing a blocky or blurry printed result. Thus, these techniques are not especially effective in terms of edge and detail rendition.

More specifically, in pixel replication, the interpolating function is piecewise constant. As such, each output pixel simply takes the value of the closest input pixel. Pixel replication especially tends to produce blocking where the sharp edge appears as stair step edge renderings. Also, pixel replication produces aliasing artifacts where undesirable spurious marks appear.

In bilinear interpolation, the interpolating function is piecewise linear, such that, known data samples are connected with straight lines. As such, each output pixel may be computed as a linear combination of up to four input pixels. Since bilinear interpolation is a simple averaging algorithm, it produces results that can be blurry.

Nonlinear scaling techniques provide an improvement to the linear scaling techniques particularly when dealing with regions with sharp edges. Primarily, the nonlinear scaling techniques locate the regions with sharp edges and treat them differently to avoid blurring cross the edge boundary. In areas not containing sharp edges, the nonlinear scaling techniques use linear scaling techniques, such as, bilinear interpolation. In general, these edge enhancement and smoothing nonlinear techniques find sharp edges in the source data and render them continuous, rather than appearing to have steps, and sharp at the target resolution without blurring the values of pixels which lie on different sides of the edge.

However, these nonlinear scaling techniques often rely on ad hoc characterizations for edge structures which may not reflect the true edge structure. Moreover, some nonlinear scaling techniques, such as those relying on stochastic models for image data, often require iterative optimization which can require excessive computational and/or storage resources.

Two prior approaches include U.S. Pat. No. 6,075,926 (Atkins et al. assigned to the common assignee of the present invention, entitled, "Computerized Method for Improving Data Resolution), and U.S. Pat. No. 6,058,248 (Atkins et al. assigned to the common assignee of the present invention, entitled, "Computerized Method for Improving Data Resolution"). Both approaches use a process to determine a class index for each input pixel, where the class refers to edge sharpness and orientation. However, these previous classification processes require that a feature vector be extracted from the window surrounding the input pixel, and further that distances be calculated between the feature vector and a predetermined set of vectors that represent the different classes requiring additional computational time and resources.

Therefore, prior art methods suffer from either being too computationally complex or too simplistic. For example, linear filtering techniques in the prior art, while less computationally intensive, are disadvantageous because of their inability to maintain sharpness of edges when increasing resolution of an image resulting in blocky or blurry results. In addition, prior art nonlinear filtering techniques, while an improvement to linear filtering, suffer from procedures that are too computationally intensive, such as, iterative operations to distinguish between sharp and smooth edges.

DISCLOSURE OF THE INVENTION

A method for image scaling is disclosed. Specifically, one embodiment of the present invention discloses a method for image scaling that begins by selecting an input pixel from a first image. An input edge characteristic is determined from an input window associated with the input pixel. The input edge characteristic is determined from a plurality of predetermined edge characteristics that are associated with sets of filter coefficients. An output window is generated by filtering the input window with a corresponding set of filter coefficients associated with the input edge characteristic. An output image is generated by repeating the above for a plurality of input pixels associated with the first image.

BEST MODES FOR CARRYING OUT THE INVENTION

Reference will now be made in detail to the preferred embodiments of the present invention, a method of image scaling. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing image scaling. In one embodiment, the computer system includes a processor coupled to a bus and memory storage coupled to the bus. The memory storage can be volatile or non-volatile and can include removable storage media. The computer can also include a display, provision for data input and output, etc. Other embodiments of the present invention can be implemented on hardware (e.g., application specific integrated circuits (ASICs)) if sufficient resources are available.

Accordingly, the present invention provides a method and system for image scaling. The present invention provides image scaling results that are of considerably higher quality than the approaches based on linear filtering (e.g., bilinear and bicubic interpolation). In addition, the present invention, while giving image scaling results comparable to the above non-linear approaches, is not computationally intensive. Furthermore, since the present invention can be implemented using integer arithmetic, hardware implementation of the image scaling technique achieves superior results that are faster and more efficient over previous techniques in the prior art.

Figure 1:
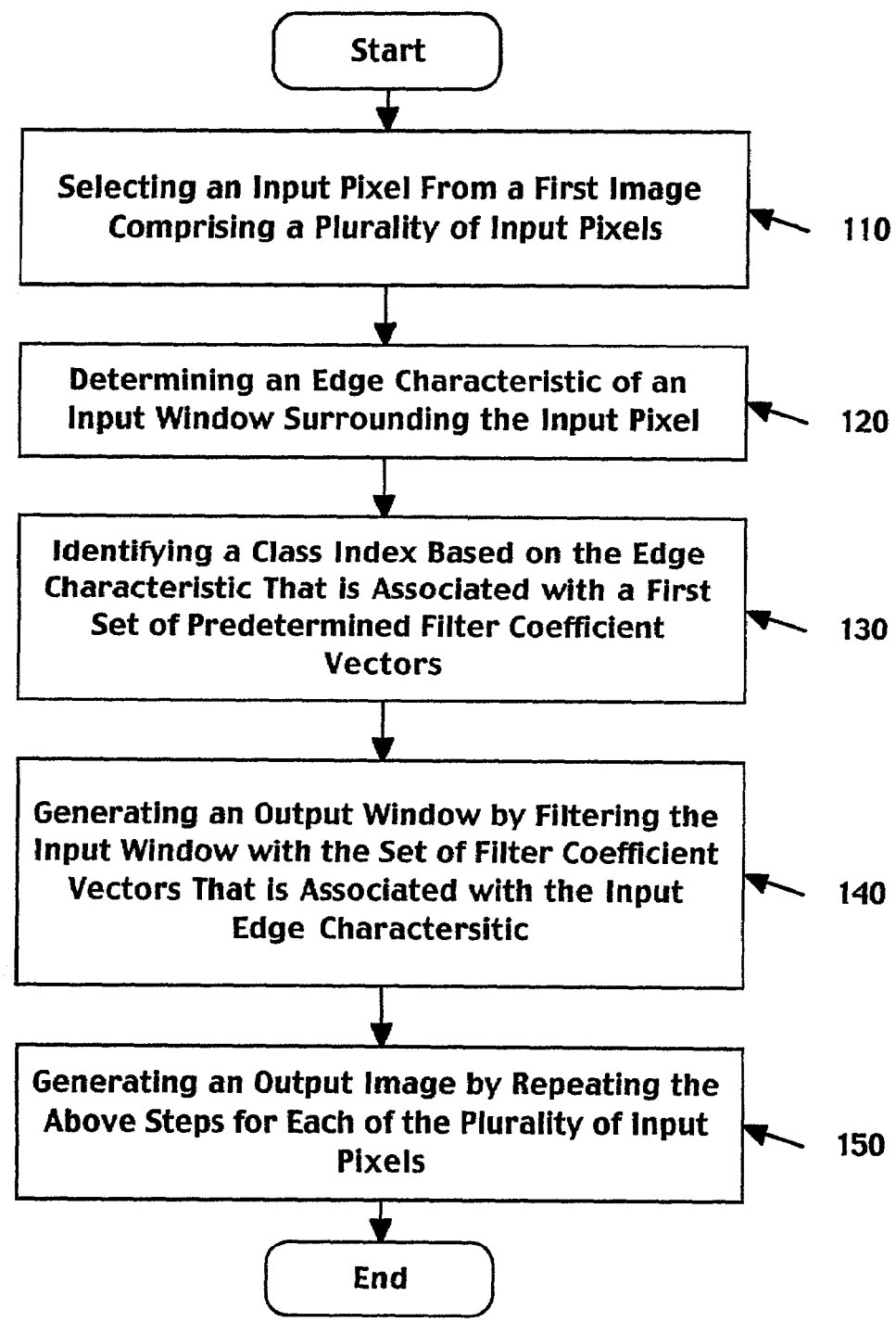
FIG. 1 is a flow diagram illustrating steps in a method of image scaling, in accordance with one embodiment of the present invention.

FIG. 1 is a flow chart 100 of the overall process illustrating steps in an exemplary method of providing image scaling in order to generate a higher resolution image of a first image, in accordance with one embodiment of the present invention. The present embodiment begins by selecting an input pixel from a first image, in step 110. The first image is of a first resolution and comprises a plurality of input pixels.

In step 120, the present embodiment proceeds by determining an input edge characteristic of an input window surrounding the input pixel. The input edge characteristic is determined from a plurality of predetermined edge characteristics. Further, the plurality of predetermined edge characteristics are associated with corresponding filter coefficients. In one embodiment, each of the plurality of predetermined edge characteristics is associated with a unique set of filter coefficient vectors. As such, the input edge characteristic is associated with a corresponding set of predetermined filter coefficient vectors. Moreover, the input window is comprised of the pixels in the first image associated with the input pixel. A first vector of pixels defines the pixel values corresponding to the pixels in the input window. In one embodiment, the input window surrounds the input pixel.

In step 130 of flow chart 100, the present embodiment proceeds by identifying a class index based on the input edge characteristic that is associated with the corresponding set of predetermined filter coefficient vectors. The class index is selected from a predetermined set of class indexes each uniquely corresponding to one of said plurality of predetermined edge characteristics. Furthermore, each of the predetermined set of class indexes corresponds to an associated set of predetermined filter coefficient vectors.

The use of the class index is for clarity and computational efficiency, since the class index uniquely corresponds to one of the plurality of predetermined edge characteristics. A complete description of the present invention may be made without reference to class indexes. As such, embodiments of the present invention are well suited to methods of image scaling that do not employ the use of class indexes as identified in step 130.

In step 140, the present embodiment proceeds by generating a block of output pixels, or an output window, by filtering the input window with a corresponding set of filter coefficient vectors that is associated with the selected class index. In one embodiment, each pixel in the output window is generated by multiplying the first vector and a corresponding filter coefficient vector from the corresponding set of filter coefficient vectors.

In step 150, the present embodiment proceeds by generating an output image having higher resolution than the first image by repeating steps 110, 120, 130, and 140 for each of the plurality of input pixels in the first image.

Figure 2:
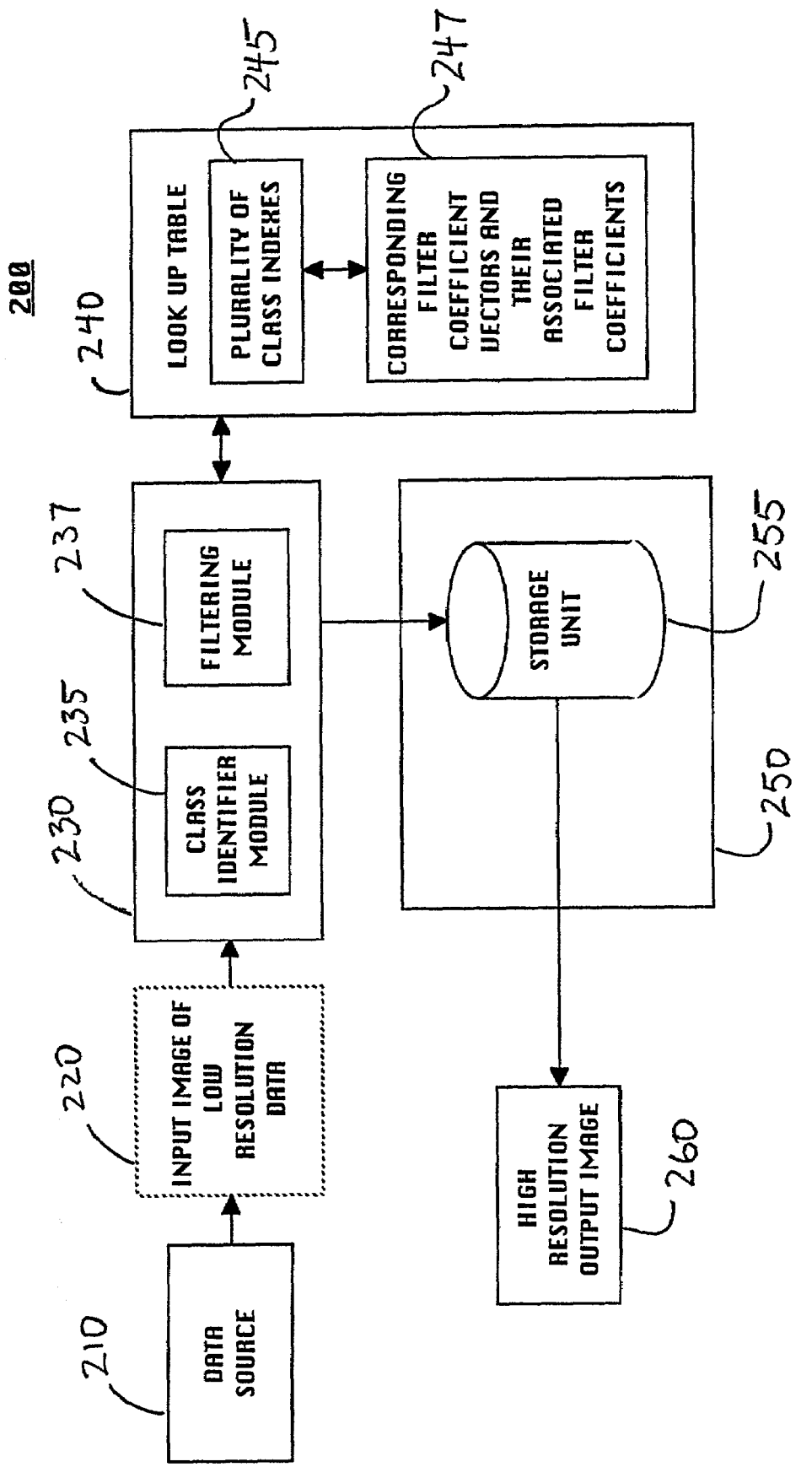
FIG. 2 is a schematic block diagram of an exemplary system for implementing a method of image scaling, in accordance with one embodiment of the present invention.

FIG. 2 is a depiction of a system 200 implementing the present invention, in accordance with one embodiment of the present invention. A data source 210 creates low resolution data. The low resolution data is the input image 220 of low resolution that is inputted into the resolution synthesis module 230. Before putting the low resolution data into an output device 250 (e.g., display, color printer, etc.), further analysis, data enhancement, and resolution synthesis steps can be performed in the data analysis and resolution synthesis module 230. The resolution synthesis module 230 contains a class identification module 235 for identifying edge characteristics, and a filtering module 237 for applying the filter coefficients to the input data in order to generate the high resolution output image 260.

Part of the analysis and resolution synthesis may require access to a look up table 240 by the resolution synthesis module 230. The look up table 240 may contain a plurality of class indexes 245, each of which is associated with a particular edge characteristic. Each of the plurality of class indexes 245 corresponds to and is associated with a unique set of predetermined filter coefficient vectors. As such, the plurality of class indexes 245 is associated with a plurality of sets of predetermined filter coefficient vectors. Within each of the predetermined filter coefficient vectors 247, the corresponding filter coefficients that comprise the predetermined filter coefficient vectors 247 are also stored in the look up table 240.

The data analysis and resolution synthesis module 230 generates an output of high resolution data. The high resolution output data can be stored in storage apparatus 255 contained within the output device 250, in accordance with one embodiment of the present invention. In addition, the high resolution output data may be further modified, or enhanced to conform the output data to the resolution capabilities of the output device 250 (e.g., a variety of user output options provided in a color printer) in order to create a high resolution output image 260.

Figure 3:
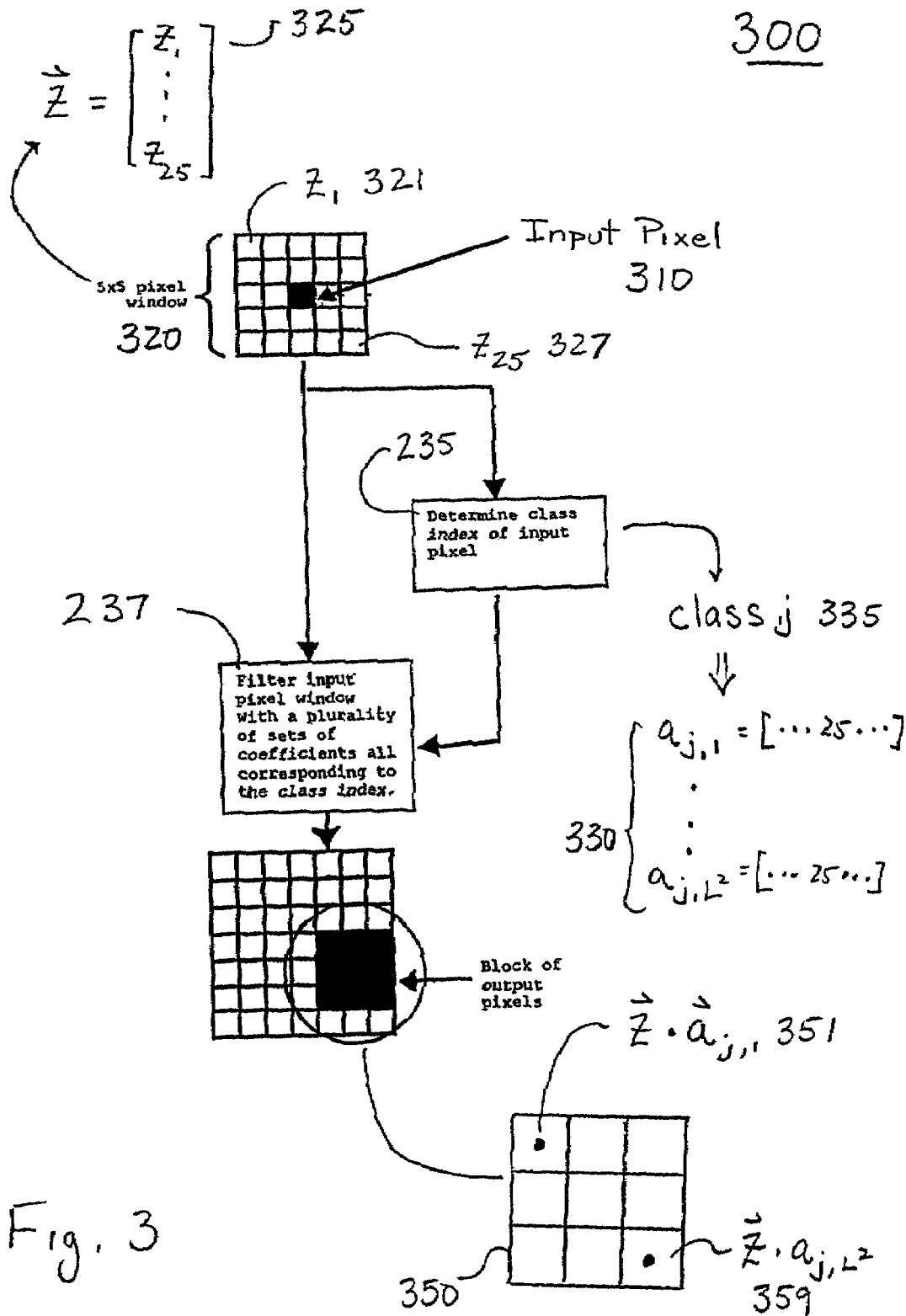
FIG. 3 is a data flow diagram illustrating the generation of an output window from an input pixel for generating a higher resolution image of an input image, in accordance with one embodiment of the present invention.

Referring now to FIG. 3, a data flow diagram 300 illustrates the generation of an output window 350 from an input pixel 310 for generating a higher resolution output image (e.g., output image 260) of an input image 220 using the image scaling method illustrated in FIG. 2, in accordance with one embodiment of the present invention.

The higher resolution output image 260 is of higher resolution than the in put image 220 by an image scaling factor L. For an input image 220 that is a first image, the resolution of the output image is an integer factor L (e.g., L is greater than or equal to 2) greater than the input image. For example, if the input image 220 is 100×100 pixels, then the output image has one of the following dimensions: 200×200, 300×300, 400×400, etc. The image scaling factor L represents the integer scaling factor. As such, L correspondingly can take any of the following integer values: 2, 3, 4, etc.

In one embodiment, the input and output images are gray scale. Although the present embodiment is employed with gray scale images for purposes of illustration, brevity, and clarity, it should be understood that the present invention can be implemented and extended to generate color output images from input color images. For example, in one embodiment, the method of image scaling would be implemented on each of the colors red, green, and blue, in an RGB color scheme. In addition, embodiments of the present invention are well suited to images represented by using other color schemes.

Returning back to FIG. 3, the general process is to generate an L×L block of output pixels for every pixel in the input image, in accordance with one embodiment. FIG. 3 illustrates the generation of an L×L block of output pixels in an output window 350 from the input pixel 310. Each L×L block is generated from an input window 320 of pixels associated with the input pixel 310. In FIG. 3, for purposes of illustration, brevity, and clarity, the output window 350 is of a 3×3 pixel dimension, where the image scaling factor L is of a value 3.

In one embodiment, the input window 320 of pixels surrounds the input pixel 310 and is of a S×S pixel dimension. For example, in FIG. 3 the input window 320 of pixels surrounding the input pixel 310 is of 5×5 pixel dimension. It is understood that the input window 320 can be modified to accommodate a lesser or greater number of pixels within the input window 320.

Other embodiments of the present invention are well suited to input windows 320 of various shapes and sizes that are associated with the input pixel 310. The various shapes and sizes of the input window 320 chosen can be determined from computational resource considerations. For example, a smaller input window 320, than that of FIG. 3, that is associated with the input pixel 310 may be used if computational resources are limited. Correspondingly, a larger input window 320 may be used if there are available computational resources.

The input window 320 can be represented by an input window vector Z 325. The components of the vector Z 325 are the pixel values of the input window 320 associated with the input pixel 310. For example, for the pixel 321 of input window 320, the pixel value $z_1$, is also the first component of the vector Z 325. Correspondingly, for the pixel 327 of input window 320, the pixel value $z_{25}$ is also the last component of the vector Z 325. In one embodiment the vector Z 325 is a column vector.

For each input pixel 310 in the input image, a class index of the associated input window 320 is determined in the class identifier module 235. In one embodiment, there are m predetermined class indexes {1 . . . m}. The class index identifies the edge characteristics of the input window 320 that is associated with the input pixel 310. In general, the class index represents edge attributes, such as edge angle and edge transition sharpness, which are critical factors in image scaling.

Further, each of the predetermined class indexes is associated with a unique set of filter coefficient vectors. The filter coefficient vectors are of a dimension to correspond to the input window 320 and the dimension of the vector Z 325. In one embodiment, the filter coefficient vectors are of S×S dimension in the form of row vectors. In the present embodiment, the filter coefficient vectors are of a 25 component dimension. In addition, each set contains up to L×L ($L^2$) filter coefficient vectors to correspond to the L×L block of output pixels in the output window 350. Also, each filter coefficient vector is for computing at least one output pixel in the output window 350.

In the present embodiment, the input pixel 310 is classified with class index j 335, with j being a number between 1 and m inclusive. As such, for input pixel 310, a class index j 335 is associated with a corresponding set of predetermined filter coefficient vectors 330 of 25 component dimension, as follows: vector $a_{j,1}$=[ ]$_{1\times25}$ through vector $a_{j,(L\times L)}$=[ ]$_{1\times25}$.

Returning now to FIG. 3, the input window 320 is filtered with the predetermined filter coefficient vectors 330 in the filtering module 237 to generate the output window 350. As stated earlier, each filter coefficient vector computes the value for one output pixel in the output window 350. For example, using the image scaling factor of 3, each input pixel has 9 corresponding output pixels. Further, for each class index there are at most 9 filter coefficient vectors. For example, in one embodiment, nine filter coefficient vectors are used: one filter coefficient vector used to compute the upper left-hand output pixel 351; and so on, until reaching the last filter coefficient vector used to compute the lower right-hand pixel 359.

In one embodiment, each of the output pixels in the output window 350 is computed by multiplying the corresponding predetermined filter coefficient vector in the set 330 of predetermined filter coefficient vectors with vector Z 325 to obtain a scalar value. For example for output pixel 351, the value is computed by multiplying vector $a_{j,1}$ with the vector Z 325, to produce a scalar value. For output pixel 359, the value is computed by multiplying vector $a_{j,(L\times L)}$ with the vector Z 325. This form of computation is commonly referred to as the dot product between the corresponding predetermined filter coefficient vector and the vector Z 325 to generate the scalar value for an associated output pixel. Vector notation is being used here to illustrate the form of the filtering process. However, the vector notation is not necessary. In fact, one skilled in the art will recognize this form of calculation is exactly the same as the filtering process more commonly known as convolution.

Formally, the output pixels are computed in the following equation:

$$OP_i = \sum_{n=1}^{25} z_n a_{j,i}(n) \quad (1)$$

where $OP_i$ is output pixel i (where the variable i indexes through the block of output pixels corresponding to the input pixel: e.g., when L=3, i ranges from 1 to 9); where $z_n$ is the $n^{th}$ element of the input window vector Z 325; and where $a_{j,i}(n)$ is the $n^{th}$ element of vector $a_{j,i}$, which is the filter coefficient vector associated with class index j used for computing the $i^{th}$ output pixel. The output window 350 is computed for $OP_i$ for i between 1 and $L^2$.

The output pixels in the output window 350 associated with the high resolution output image 260 may be generated in any order, in one embodiment, or even in parallel if resources allow, in another embodiment. Further, in still another embodiment, output pixels in the high resolution output image 260 are generated by processing the input pixels in raster order.

Figure 4:
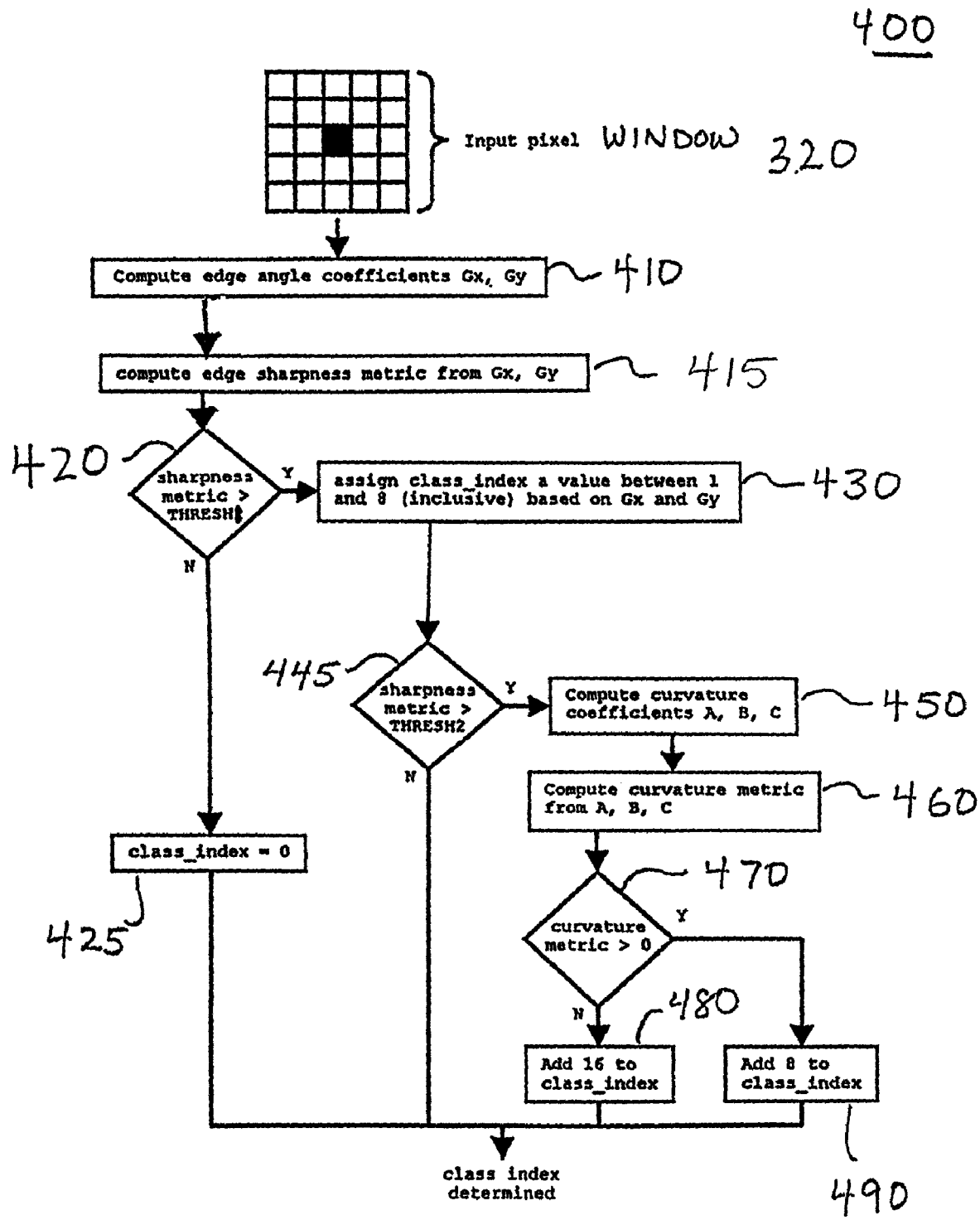
FIG. 4 is a flow diagram illustrating steps in a method of image scaling for determining a class index associated with an edge characteristic for an input window surrounding an input pixel, in accordance with one embodiment of the present invention.

The input pixel 310 classification process is illustrated in the flow chart 400 of FIG. 4. Flow chart 400 illustrates steps in a method for determining the edge characteristic and selecting the class index for the input pixel 310 of steps 120, and optionally 130, of FIG. 1, in accordance with one embodiment of the present invention.

In one embodiment, there are 25 different class indexes describing edge characteristics, which can be divided into 4 groups. In the first group, classes 1 through 8 represent relatively smooth transitions having different angular orientations. The angles can be quantized into 8 separate bins, each subtending 45 degrees of arc. For each class in the first group, there is a corresponding class in the second and third group. The corresponding class in the second and third group represents a sharper edge with the same angular orientation. However, in the second group, classes 9 through 16 are for pixels that lie on the dark side of sharp edges. Also, in the third group, classes 17 through 24 are for pixels that lie on the light side of sharp edges. The second and third group represent relatively sharp edge transitions. Finally, in the fourth group, class zero (O) usually corresponds to the case where there are no transitions or edges at all.

Although the present embodiment is employed with 25 different class indexes for purposes of illustration, brevity, and clarity, it should be understood that other lesser or greater numbers of index classes could be employed in conjunction with the present invention.

The class index selection is based on gradient information along two different directions which conveys the angle of any edge present at the input pixel 310 within the input pixel window 320. The gradient information can be summarized by edge angle coefficients $G_x$ and $G_y$, where x and y represent two different directions. In one embodiment, x and y are perpendicular to each other.

Depending on the gradient information, the class index selection may also be based on curvature information (A, B, and C), which describes the side of the edge the input pixel lies within (e.g., the darker side or the lighter side).

Figure 5:
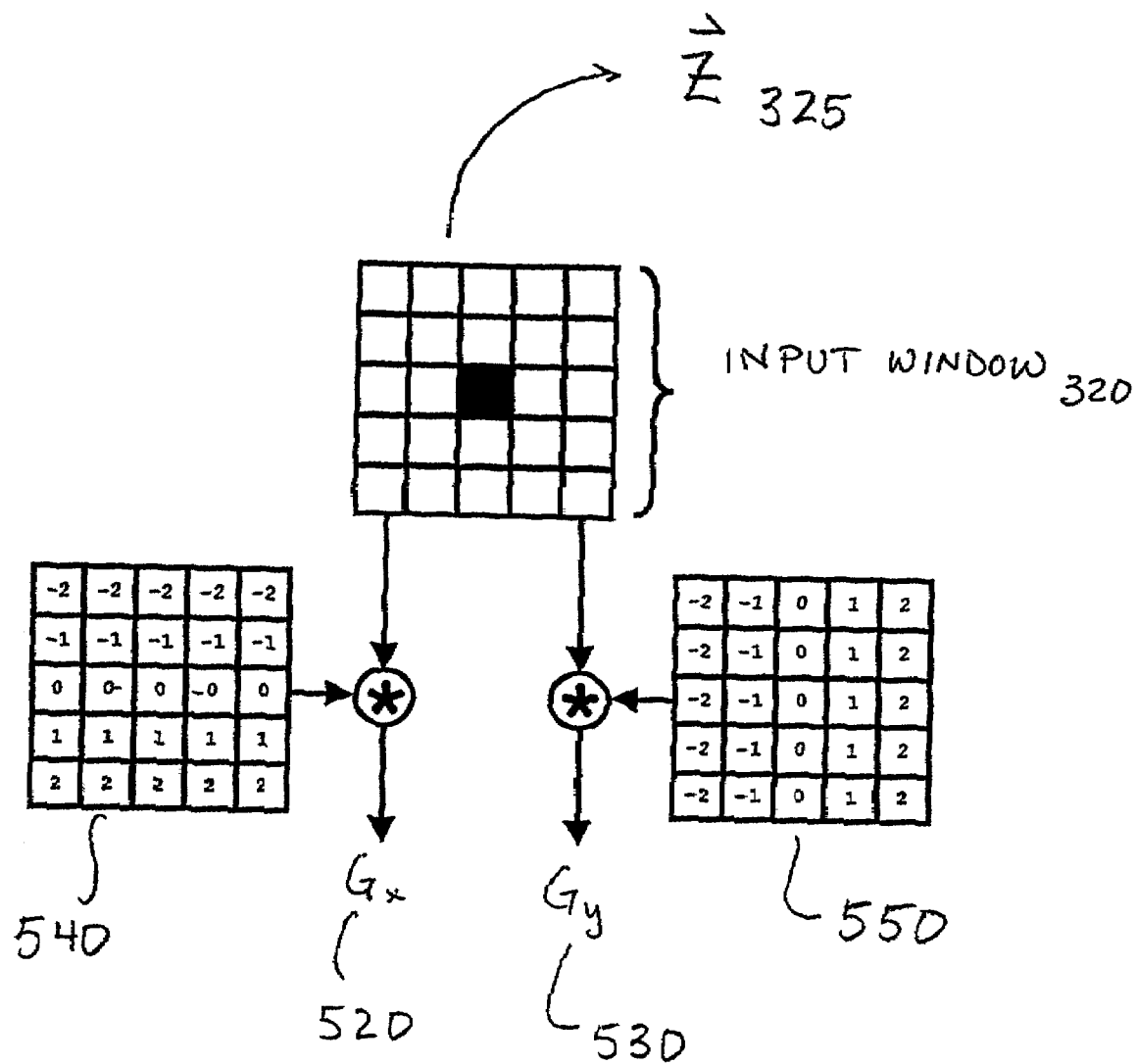
FIG. 5 is a data flow diagram illustrating the computation of edge angle coefficients, in accordance with one embodiment of the present invention.

Referring now back to FIG. 4, flow chart 400 begins with step 410 by computing the edge angle coefficients $G_x$ and $G_y$ of the input window 320 in order to determine the gradient information, in accordance with one embodiment of the present invention. The diagram in FIG. 5 illustrates the two operators 540 and 550 for generating the edge angle coefficients $G_x$ 520 and $G_y$ 530. For example, the scalar value of coefficient $G_x$ 520 is computed by the following equation:

$$G_x = \sum_{n=1}^{25} z_n C_x(n) \quad (2)$$

where $z_n$ is the $n^{th}$ element of the input window vector Z 325, and $C_x(n)$ is the $n^{th}$ element of vector $C_x$ which comprises the coefficients in operator 540, with an order analogous to the order of elements in input window vector Z 325.

Similarly, the scalar value of edge angle coefficient $G_y$ 530 is computed by the following equation:

$$G_y = \sum_{n=1}^{25} z_n C_y(n) \qquad (3)$$

where $Z_n$ is the $n^{th}$ element of the input window vector Z 325, and $C_y(n)$ is the $n^{th}$ element of vector $C_y$ which comprises the coefficients in operator 550, with an order analogous to the order of elements in input window vector Z 325.

Returning back to FIG. 4, after computing the edge angle coefficients $G_x$ 520 and $G_y$ 530, the present embodiment then computes an edge sharpness metric in step 415 in the following equation:

$$\text{Edge Sharpness Metric} = (G_x)(G_x) + (G_y)(G_y) \qquad (4)$$

In decision step 420, the edge sharpness metric is compared to a first threshold value (THRESH1) to determine whether an edge is present in the input window 320. In one embodiment, THRESH1 is equal to zero, which indicates the complete absence of an edge. In one embodiment, the value of THRESH1 was determined empirically, and remained fixed for all input pixels in the input image. In another embodiment, the value of THRESH1 can change from input image to input image, or from input pixel to input pixel.

If the edge sharpness metric is less than or equal to THRESH1, the present embodiment proceeds to step 425 where the class index j 335 is defined to be zero, and the classification process for input pixel 310 ends.

On the other hand, if the edge sharpness metric is greater than THRESH1, this indicates the presence of an edge within the input window 320. The present embodiment then proceeds to step 430 to determine an angular orientation of the edge within the input window 320, and based on the angular orientation to determine an initial or tentative class index between 1 and 8 based on $G_x$ 520 and $G_y$ 530.

Figure 6:
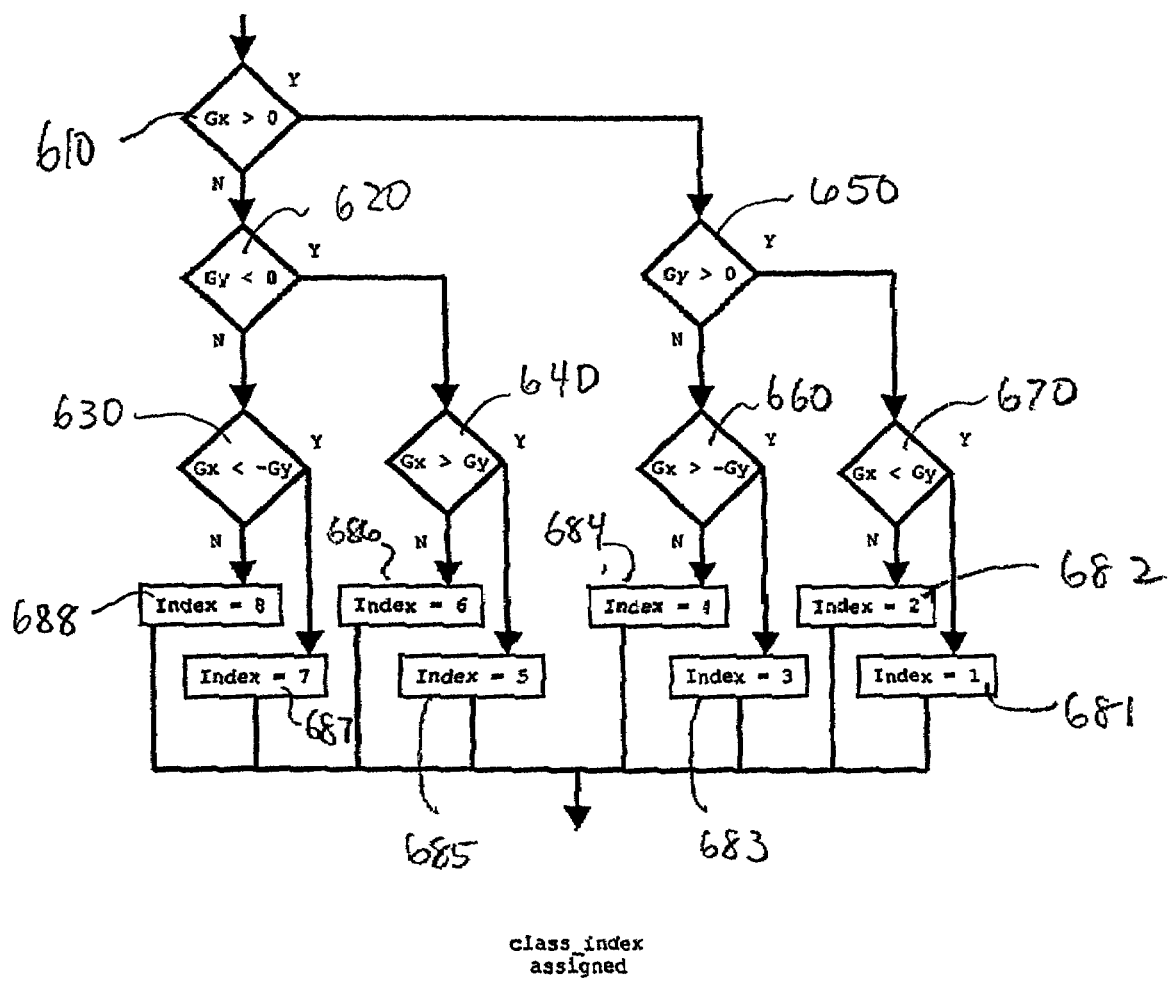
FIG. 6 is a data flow diagram illustrating the tentative assignation of a class index associated with an edge characteristics, in accordance with one embodiment of the present invention.

FIG. 6 is a flow chart 600 illustrating steps in a method for determining the tentative class index for the input pixel 310, as illustrated by step 430 of FIG. 4. In FIG. 6, the present embodiment quantizes the edge angle coefficients $G_x$ 520 and $G_y$ 530 into subsets of angular orientation. An edge angle metric defining the angular orientation of the edge within the input window 320 can then be computed to determine the tentative class index as disclosed in FIG. 6.

In decision step 610, the present embodiment determines if $G_x$ 520 is greater than zero. If $G_x$ 520 is less than or equal to zero, then the present embodiment proceeds to decision step 620 to determine if $G_y$ 530 is less than zero. If $G_y$ 530 is greater than or equal to zero, then the present embodiment determines if $G_x$ 520 is less than the negative of $G_y$ 530. If $G_x$ 520 is greater than or equal to the negative of $G_y$ 530, then the tentative class index is assigned as index 8 in step 688. On the other hand, if $G_x$ 520 is less than the negative of $G_y$ 530, then the tentative class index is assigned as index 7 in step 687.

Returning back to decision step 620, if $G_y$ 530 is less than zero, then the present embodiment proceeds to decision step 640 to determine if $G_x$ 520 is greater than $G_y$ 530. If $G_x$ 520 is less than or equal to $G_y$ 530, then the tentative class index is assigned as class index 6 in step 686. On the other hand, if $G_x$ 520 is greater than $G_y$ 530, then the tentative class index is assigned as class index 5 in step 685.

Returning back to decision step 610, if $G_x$ 520 is greater than zero, then the present embodiment proceeds to decision step 650 to determine if $G_y$ 530 is greater than zero. If $G_y$ 530 is less than or equal to zero, then the present embodiment proceeds to decision step 660 to determine if $G_x$ 520 is greater than the negative of $G_y$ 530. If $G_x$ 520 is less than or equal to the negative of $G_y$ 530, then the present embodiment assigns the tentative class index as class index 4 in step 684. On the other hand, if $G_x$ 520 is greater than the negative of $G_y$ 530, then the tentative class index is assigned as class index 3 in step 683.

Returning back to decision step 650, if $G_y$ 530 is greater than zero, then the present embodiment proceeds to decision step 670 to determine if $G_x$ 520 if less than $G_y$ 530. If $G_x$ 520 is greater than or equal to $G_y$ 530, then the present embodiment assigns the tentative class index as class index 2 in step 682. On the other hand, if $G_x$ 520 is less than $G_y$ 530, then the present embodiment assigns the tentative class index as class index 1 in step 681.

Returning back to FIG. 4, after determining the tentative class index, the present embodiment then proceeds to decision step 445 to compare the edge sharpness metric to a second threshold value (THRESH2). Whereas the purpose of step 420 was to detect if an edge is present, step 445 determines whether the edge exhibits a smooth transition or a sharp transition. If the edge sharpness metric is less than or equal to THRESH2, this is indicative of a smooth transition, and the tentative class index is regarded as the true class index j 335. In one embodiment, the value of THRESH2 was determined empirically, and remained fixed for all input pixels in the input image. In another embodiment, the value of THRESH2 can change from input image to input image, or from input pixel to input pixel.

Figure 7:
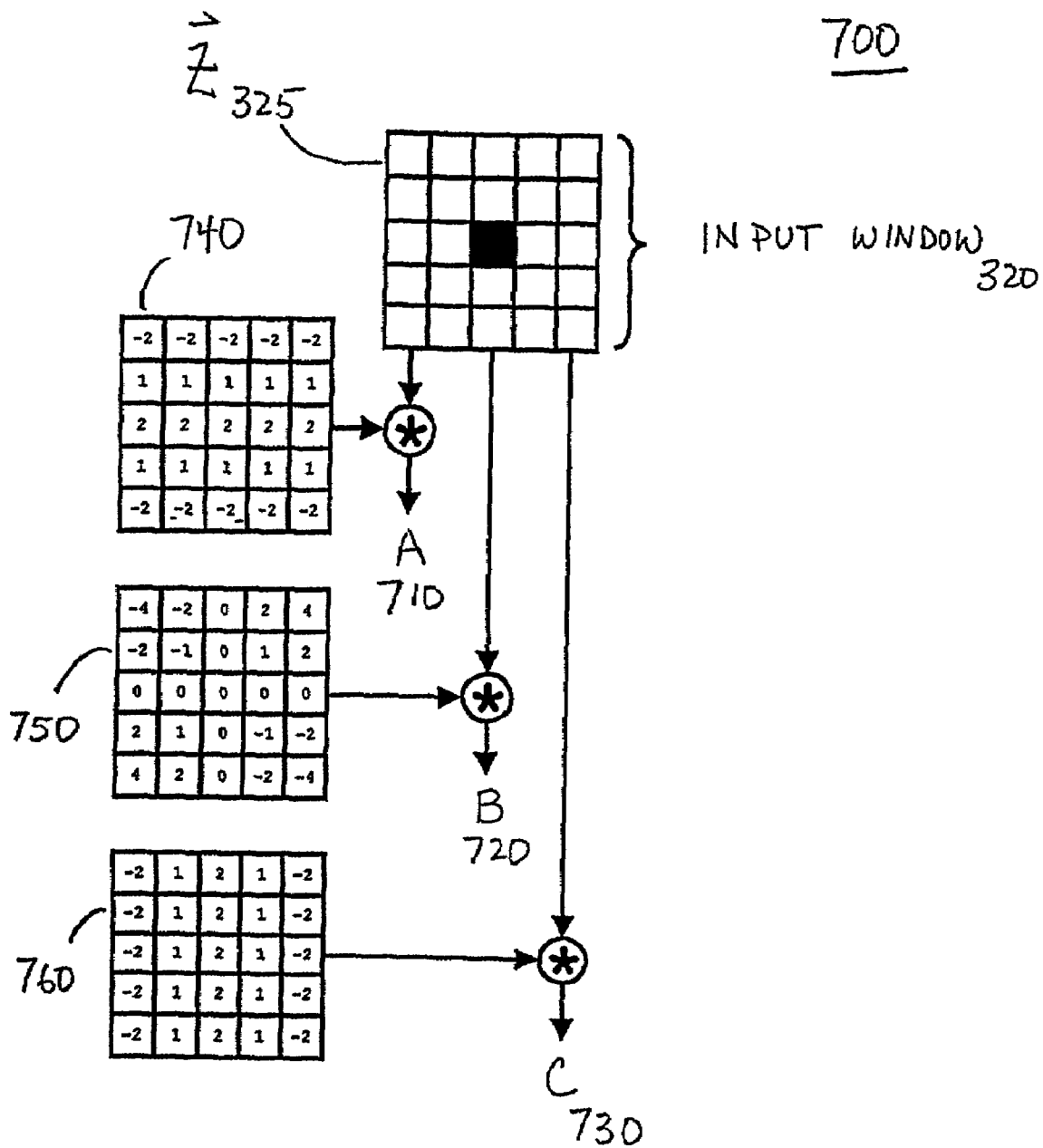
FIG. 7 is a data flow diagram illustrating the computation of curvature coefficients, in accordance with one embodiment of the present invention.

On the other hand, if the edge sharpness metric is greater than or exceeds the threshold value THRESH2, then the present embodiment proceeds to step 450 to compute the curvature coefficients A 710, B 720, and C 730. The diagram 700 in FIG. 7 illustrates the three operator operations 740, 750, and 760 for generating the curvature coefficients A 710, B 720, and C 730. Essentially, the scalar value of curvature coefficient A 710, is computed by multiplying the vector Z 325 associated with the input window 320 surrounding the input pixel 310 with the operator 740 in vector form. Correspondingly, the scalar value of curvature coefficient B 720 is computed by multiplying the vector Z 325 with the operator 750 in vector form. Also, the scalar value of curvature coefficient C 730 is computed by multiplying the vector Z 325 with the operator 760 in vector form.

Returning back to FIG. 4, the present embodiment then proceeds to step 460 to compute the curvature metric in the following equation:

$$(\tfrac{1}{2})A(G_x)^2 + B G_x G_y + (\tfrac{1}{2})C(G_y)^2 \qquad (5)$$

In decision step 470, the present embodiment determines whether the curvature metric, as determined in Equation 5, is greater than zero. If the curvature metric is less than or equal to zero, indicating pixels that lie on the light side of the edge, then the value of sixteen is added to the tentative class index, as determined in step 430, to determine the class index j 335 of the input pixel 310. On the other hand, if the curvature metric is greater than zero, indicating pixels that lie on the dark side of the edge, then the value of eight is added to the tentative class index to determine the class index j 335 of the input pixel 310.

Although the present embodiment discloses the computation of the curvature coefficients A 710, B 720, and C 730, as well as, the curvature metric, other embodiments are well suited to determining the class index without computing the curvature coefficients A 710, B 720, and C 730, or the curvature metric. In that case, from decision step 445, if the edge sharpness metric is greater than THRESH2, the present embodiment would proceed to step 490. The tentative class index would be determined from a group of class indexes that represent relatively sharp edges, such as those in the second and third groups of class indexes, as discussed previously.

Figure 8:
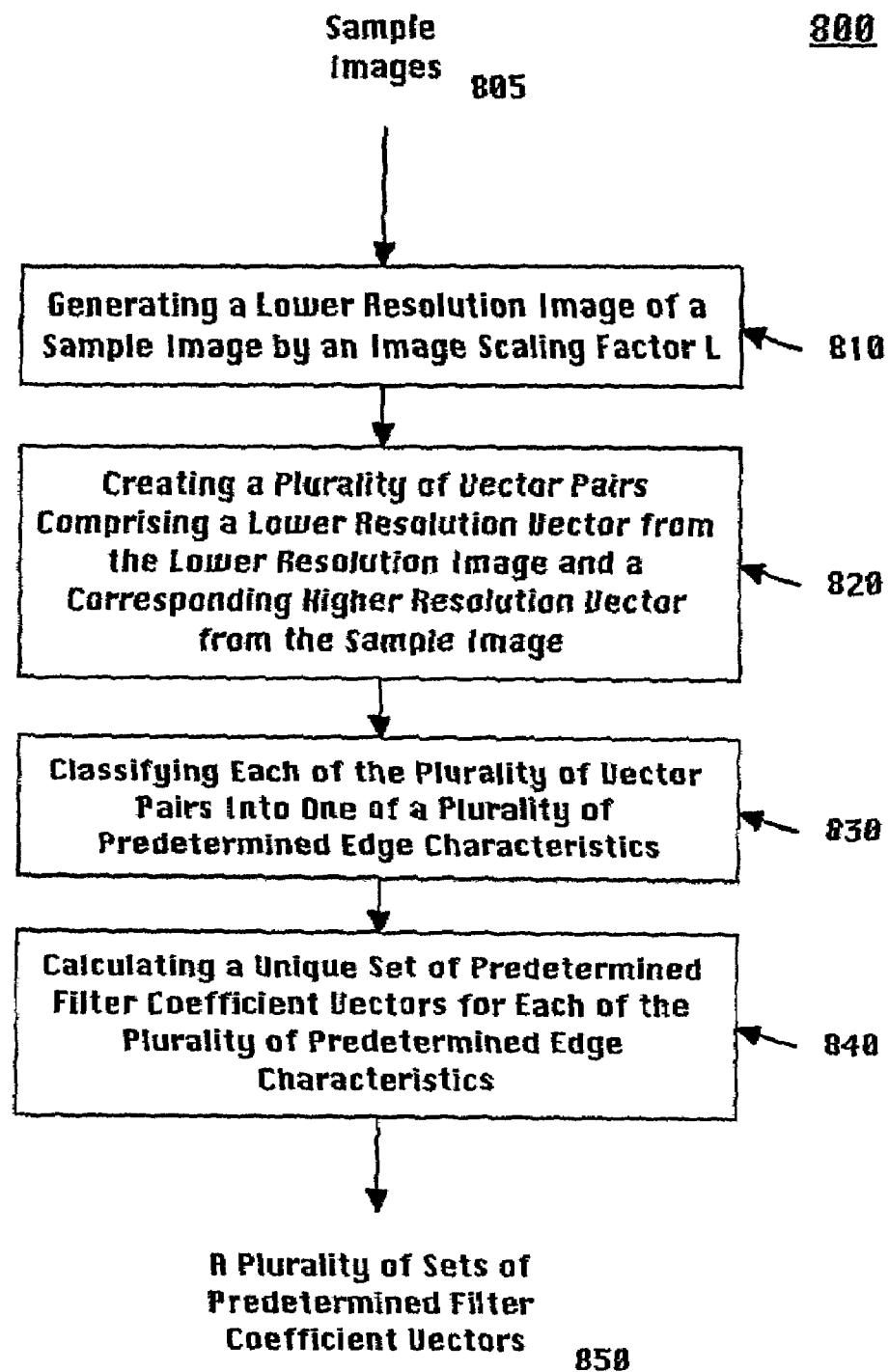
FIG. 8 is a flow diagram illustrating steps in a method of image scaling for calculating a plurality of sets of predetermined filter coefficient vectors, in accordance with one embodiment of the present invention.

Referring now to FIG. 8, a flow chart 800 illustrates steps in a method to generate filter parameters or coefficients for image scaling, in accordance with one embodiment of the present invention. The filter coefficients may be used to scale images not in the set of sample images 805 to provide image scaling to deliver output scaled images of high quality as when compared with conventional image scaling techniques.

Other embodiments of the present invention are well suited to other means or methods for determining filter coefficients used for generating higher resolution images that may or may not involve the use of sample images (e.g., heuristic techniques, etc.).

The filter coefficients are generated for a given integer image scaling factor (e.g., L). The image scaling factor can be any integer greater than 1, as previously discussed.

The present embodiment generates lower resolution images from sample images 805, in step 810. The sample images 805 are digital images, such as stock photographs from an image library. For each sample image, a lower resolution image is created based on the corresponding sample image. The lower resolution image has a lower resolution than the corresponding sample image by the image scaling factor L. As such, the sample image is also of a higher resolution than its corresponding lower resolution image by the image scaling factor L.

In one embodiment, each of the lower resolution images is generated by block averaging its corresponding sample image. As such, each pixel in the lower resolution image is generated as the average of the corresponding L×L sample output block 1033 of pixels in the original higher resolution sample image, where L is the image scaling factor. For example, the sample output block window 1033 of the sample image 1030 is averaged to obtain the value for pixel 1015 in the lower resolution image, a portion of which is shown by sample input window 1020 associated with sample input pixel 1015.

In step 820, for pixels in the lower resolution image, a vector pair is created of a low resolution vector from the lower resolution image corresponding to the sample input window 1020, and its corresponding higher resolution vector from the sample output block 1033 from the sample image 1030. The vector pair is denoted as (X,Z): where vector X is the higher resolution vector and vector Z is the lower resolution vector. For any given pixel in the lower resolution sample images, the lower resolution vector includes the window of pixels associated with that pixel, and the higher resolution vector includes the L×L block of high-resolution pixels that correspond to the low-resolution pixel. A plurality of vector pairs is created for all the sample input images 805.

Figure 9:
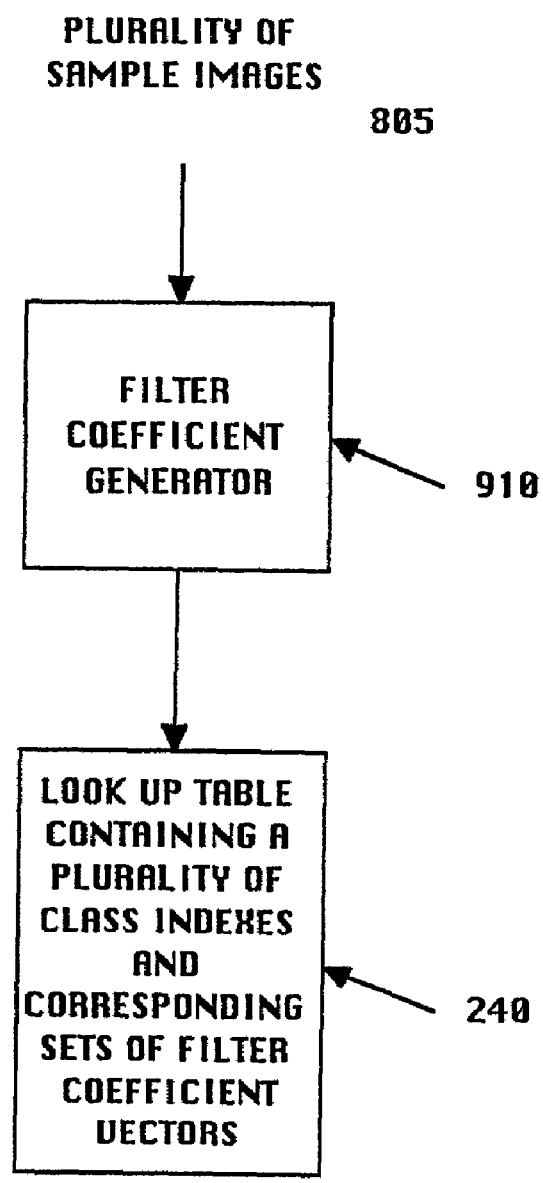
FIG. 9 is a data flow diagram illustrating the generation of the plurality of sets of filter coefficient vectors, in accordance with one embodiment of the present invention.

FIG. 9 is a depiction of a system 900 for generating filter coefficients used for generating higher resolution images of an input image. In system 900, a plurality of sample images 805 is inputted into a filter coefficient generator 910. The filter coefficient generator implements the method disclosed in FIG. 8 to generate sets of filter coefficient vectors for a given image scaling factor L. The sets of filter coefficient vectors correspond to a plurality of predetermined edge characteristics and can be stored in look up table 240 of FIG. 2.

Figure 10:
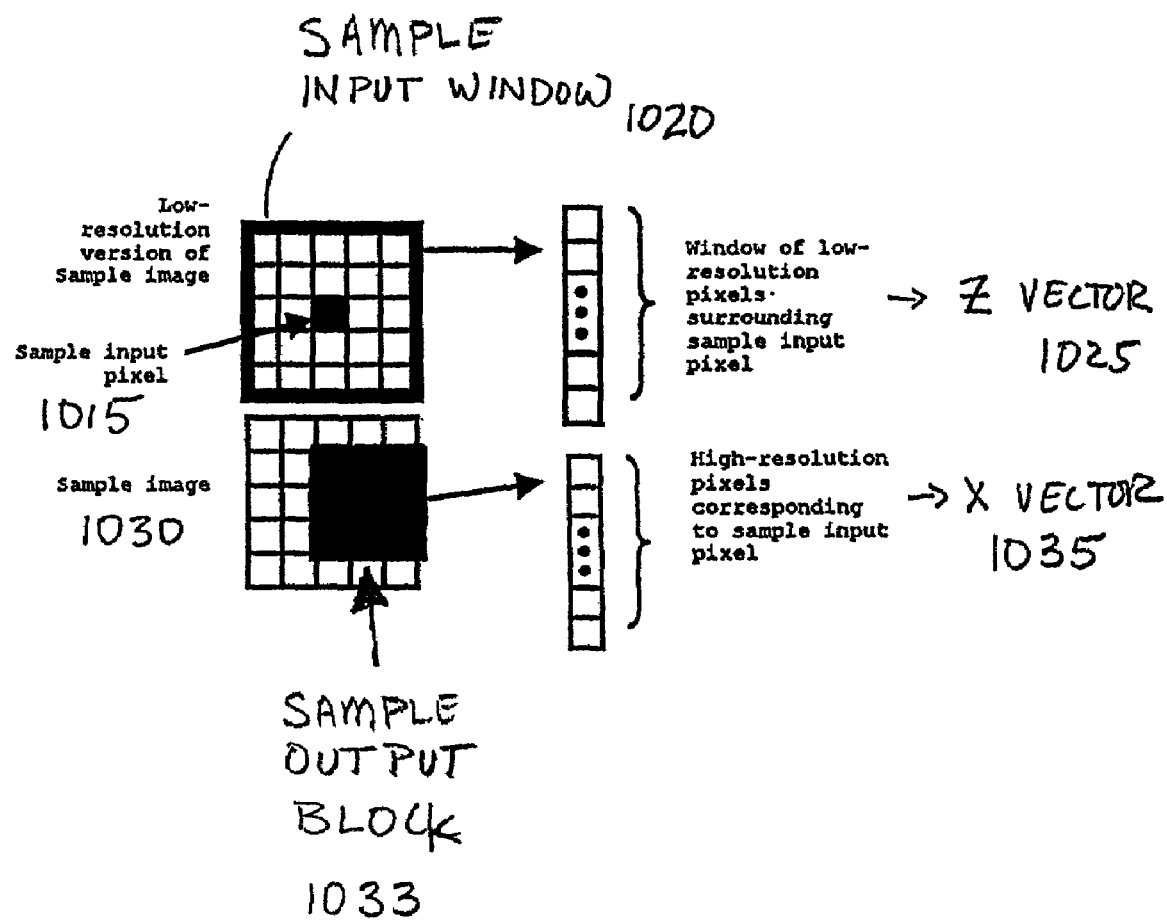
FIG. 10 is a diagram illustrating a sample image and its corresponding low resolution image used for calculating a plurality of sets of filter coefficient vectors used for image scaling, in accordance with one embodiment of the present invention.

FIG. 10 illustrates the creation of a vector pair for the input pixel 1015 of the lower resolution image that is associated with the sample image 1030. The vector pair for the input pixel 1015 comprises the vector 1025 associated with the pixel window 1020 from the low resolution image, and the vector 1035 associated with the output block 1033 from the high resolution sample image. The process is performed for a sufficiently large subset of pixels from the lower resolution images associated with the sample images 805.

In step 830 of FIG. 8, each of the plurality of vector pairs is classified according to the predetermined class indexes, as previously discussed, using vector Z from each sample vector pair (X,Z). Each of the class indexes are associated with a particular edge characteristic that represents the edge attributes, such as, edge angle and edge transition sharpness, etc. that are critical factors in image scaling techniques.

In step 840, once all the vector pairs are classified, a unique set of predetermined filter coefficient vectors can be calculated for each of the plurality of class indexes, each of which are associated with a predetermined edge characteristic. As such, an output of a plurality of sets of filter coefficient vectors 850 is generated that are the predetermined filter coefficients as used for generating a higher resolution image of an input image as disclosed in FIG. 3 and flow chart 100.

From the vector pairs, classified as being associated with class j in step 840, the average of the low resolution Z vectors, which correspond to the windows surrounding the input pixels from the lower resolution images (e.g., input window 1020), is computed in the following equation:

$$\mu_{Z,j} = \frac{1}{N_j} \sum_{k=1}^{N_j} Z_k \qquad (6A)$$

In addition, the average of the corresponding X vectors, which correspond to the output block window (e.g., block 1033) from the high resolution image sample (e.g., sample image 1033) is computed from the following equation:

$$\mu_{X,j} = \frac{1}{N_j} \sum_{k=1}^{N_j} X_k \qquad (6B)$$

Also, the sample covariance matrix of the Z vectors, and the sample cross covariance matrix of the X and Z vectors are computed from the following equations, respectively:

$$\Gamma_{Z,j} = \frac{1}{N_j} \sum_{k=1}^{N_j} (Z_k - \mu_{Z,j})(Z_k - \mu_{Z,j})^T \qquad (6C)$$

and

-continued $$\Gamma_{XZ,j} = \frac{1}{N_j} \sum_{k=1}^{N_j} (X_k - \mu_{X,j})(Z_k - \mu_{Z,j})^T \qquad (6D)$$

Each of the quantities computed in Equations 6A through 6D is computed separately for each class index value of j between 1 and m inclusive. For any given value j, $N_j$ is the number of sample vector pairs classified into class j, as described in step 830. In addition, for any given value of j, the sums in Equations 6A through 6D include only the vectors classified into class j in step 830. Superscript T in Equations 6C and 6D denotes the vector transpose, which is well known to one skilled in the art. Superscript (−1) denotes the matrix inverse, which is well known to one skilled in the art.

Thereafter, the image scaling filter coefficients for each of the sets of filter coefficient vectors, which correspond to each of the class indexes are calculated according to the following equation:

$$A_j = \Gamma_{XZ,j}(\Gamma_{Z,j})^{-1} \qquad (7)$$

where $A_j$ is a matrix having L×L rows and a number of columns equal to the dimension of the low resolution Z vector, whose rows are the filter coefficient vectors for class index j. The quantity in Equation (7) is computed for each class index value of j between 1 and m inclusive.

Image scaling results of the present invention are of considerably higher quality than the approaches based on linear filtering, such as bilinear and bicubic interpolation.

The present invention, while giving image scaling results comparable to the above non-linear approaches, is not computationally intensive. For example, in one embodiment, the method of image scaling is not iterative, but rather requires only one pass through the input image. Further, the method of image scaling does not rely on ad-hoc models for high-resolution image edge structure but rather makes use of specialized prediction filters to compute the output pixels as a function of the pixels in the vicinity of the input pixel. As such, the classification of edge characteristics of input pixels in input images is more efficient and faster.

Furthermore, this invention may be implemented using only integer arithmetic. This may be a significant advantage for hardware implementation of the method for image scaling as described in FIG. 1.

The preferred embodiment of the present invention, a method for image scaling, is thus described. While the present invention has been described in particular embodiments, it should be appreciated that the present invention should not be construed as limited by such embodiments, but rather construed according to the below claims.

What is claimed is:

1. A method of image scaling comprising:
   selecting an input pixel associated with a first image;
   determining an input edge characteristic, from a plurality of predetermined edge characteristics associated with a plurality of sets of filter coefficients, of an input window associated with said input pixel, wherein said input edge characteristic defines an edge angle and an edge sharpness of said input window;
   generating an output window by filtering said input window with a corresponding set of filter coefficients based on said input edge characteristic, wherein said output window is scaled by an image scaling factor L over said input pixel; and
   generating an output image of a higher resolution than said first image by said image scaling factor L by repeating said steps of selecting, determining, generating said output window, and generating said output image for a plurality of input pixels associated with said first image without requiring distances to be calculated between vectors.

2. The method of image scaling as described in claim 1, further comprising:
   determining filter coefficients for said plurality of sets of filter coefficients according to said image scaling factor L, said determining of filter coefficients performed before said selecting said input pixel.

3. The method of image scaling as described in claim 2, wherein said determining filter coefficients comprises:
   generating a lower resolution image by said image scaling factor L of a sample image;
   creating a plurality of window pairs for pixels in said lower resolution image comprising a lower resolution window of a first dimension equal to said input window, and a higher resolution window of a second dimension equal to said output window;
   classifying every window pair as one of said plurality of predetermined edge characteristics; and
   for every predetermined edge characteristic, calculating its associated set of predetermined filter coefficients from associated window pairs.

4. The method of image scaling as described in claim 3, further comprising:
   repeating steps for generating said lower resolution, creating said plurality of window pairs, and classifying every window pair for a plurality of sample images, said repeating performed before the step of calculating its associated set of predetermined filter coefficients.

5. The method of image scaling as described in claim 1, wherein said generating said output window comprises:
   generating an output pixel in said output window by computing the dot product of a first vector of pixels associated with said input window and a corresponding filter coefficient vector associated with said corresponding set of filter coefficients.

6. The method of image scaling as described in claim 1, wherein the steps of selecting, determining, generating said output window, and generating said output are performed using integer arithmetic.

7. The method of image scaling as described in claim 1, wherein said determining said input edge characteristic further comprises:
   determining an edge angle metric;
   determining an edge sharpness metric;
   determining said input edge characteristic based on said edge sharpness metric and said edge angle metric.

8. The method of image scaling as described in claim 7, further comprising:
   determining edge angle coefficients, said determining edge angle coefficients performed before the step of determining said edge angle metric, wherein said edge angle metric and said edge sharpness metric are based on said angle coefficients.

9. The method of image scaling as described in claim 7, further comprising:
   determining the absence of an edge when said edge sharpness metric is less than or equal to a first threshold;
   determining a smooth edge transition when said edge sharpness metric is less than or equal to a second threshold; and determining a sharp edge when said edge sharpness metric is greater than said second threshold.

10. The method of image scaling as described in claim 7, wherein said determining said edge angle metric further comprises:
    determining edge angle coefficients; and
    quantizing said edge angle coefficients into edge angles for determining said edge angle metric.

11. The method of image scaling as described in claim 1, wherein said input window surrounds said input pixel.

12. The method of image scaling as described in claim 1, wherein said output window is of L×L pixel dimension.

13. A method of image scaling comprising:
    selecting an input pixel associated with a first image of a first resolution, said first image comprising a plurality of input pixels;
    determining an input edge characteristic, from a plurality of predetermined edge characteristics, of an input window associated with said input pixel and comprising a first vector of pixels from said input window, wherein said input pixel and characteristic defines an edge angle and an edge sharpness of said input window;
    identifying a class index based on said input edge characteristic from a predetermined set of class indexes corresponding to said plurality of predetermined edge characteristics, said class index associated with a corresponding set of predetermined filter coefficient vectors;
    generating an output window by filtering said input window with said corresponding set of predetermined filter coefficient vectors, wherein said output window is scaled by an image scaling factor L over said input pixel; and
    generating an output image by repeating said steps of selecting said input pixel, determining said input edge characteristic, identifying said class index, and generating said output window for said plurality of input pixels without requiring distances to be calculated between vectors.

14. The method of image scaling as described in claim 13, wherein said output image is of a second resolution that is greater than said first resolution by an image scaling factor L that is an integer greater than or equal to two, and wherein said output window is of L×L dimension.

15. The method of image scaling as described in claim 13, wherein said input window surrounds said input pixel and is of S×S pixel dimension, and wherein each filter coefficient vector of said corresponding set of predetermined filter coefficient vectors has S×S coefficients.

16. The method of image scaling as described in claim 15, wherein said input window is of 5×5 pixel dimension.

17. The method of image scaling as described in claim 13, wherein said determining said input edge characteristic further comprises:
    calculating a first edge angle coefficient along a first direction;
    calculating a second edge angle coefficient along a second direction;
    computing an edge sharpness metric based on said first and second edge angle coefficients;
    determining whether an edge is present in said input window based on said edge sharpness metric;
    assigning a first predetermined edge characteristic as said input edge characteristic if said edge is not present; and
    determining a second edge characteristic from said plurality of predetermined edge characteristics for said input edge characteristic if said edge is present.

18. The method of image scaling as described in claim 17, wherein said determining said second edge characteristic comprises:
    determining an edge angle metric based on said first and second edge angle coefficients;
    determining whether said edge sharpness metric indicates less than a degree of sharpness;
    selecting one of a first group of edge characteristics if said edge sharpness metric indicates less than said degree of sharpness; and
    selecting one of a second group of edge characteristics if said edge sharpness metric does not indicate less than said degree of sharpness.

19. The method of image scaling as described in claim 17, wherein said computing said edge sharpness metric further comprises:
    computing said edge sharpness metric by adding the square of said first edge angle coefficient to the square of the second edge angle coefficient.

20. The method of image scaling as described in claim 17, wherein said determining whether said edge is present further comprises:
    comparing said edge sharpness metric to a threshold, said edge not present when said edge sharpness metric is less than or equal to said threshold.

21. The method of image scaling as described in claim 18, wherein said determining said edge angle metric further comprises:
    quantizing said edge angle coefficients into edge angles for determining said edge angle metric.

22. The method of image scaling as described in claim 13, wherein said generating said output window comprises:
    generating each pixel scalar value in said output window by computing the dot product of said first vector and a corresponding filter coefficient vector from said corresponding set of filter coefficient vectors.

23. The method of image scaling as described in claim 18, wherein said determining whether said edge sharpness metric indicates less than a degree of sharpness further comprises:
    comparing said edge sharpness metric to a threshold, said edge sharpness metric not indicating said degree of sharpness if said edge sharpness metric is less than or equal to said threshold.

24. The method of image scaling as described in claim 13, further comprising:
    determining filter coefficients for said plurality of class indexes.

25. The method of image scaling as described in claim 24, wherein said determining filter coefficients comprises:
    generating a lower resolution image of a sample image by an image scaling factor L;
    creating a plurality of vector pairs for pixels in said lower resolution image comprising a lower resolution vector of a first dimension equal to said first vector, and a higher resolution vector of a corresponding output window in said sample image;
    classifying each of said plurality of vector pairs into one of said plurality of predetermined edge characteristics; and
    for every predetermined edge characteristic, calculating its associated set of predetermined filter coefficient vectors from associated vector pairs.

26. The method of image scaling as described in claim 25, further comprising:
    repeating steps of generating said lower resolution image, creating said plurality of vector pairs, and classifying each of said plurality of vector pairs for a plurality of sample images, said repeating performed before the steps of performing the step of calculating its associated set of predetermined filter coefficient vectors.

27. A method of image scaling comprising:
generating a plurality of lower resolution images of a plurality of sample images by an image scaling factor L;
pairing input windows associated with pixels in said plurality of lower resolution images with corresponding output windows associated with pixels in said plurality of sample images into a plurality of window pairs;
classifying each of said plurality of window pairs into a plurality of predetermined edge characteristics, wherein each of said plurality of predetermined input edge characteristics defines an edge angle and an edge sharpness of a corresponding input window;
calculating filter coefficients for said plurality of predetermined edge characteristics; and
generating an output image of a higher resolution than an input image comprising a plurality of input pixels by said image scaling factor L by calculating an L×L block of output pixels for each of said plurality of input pixels using said filer coefficients without requiring distances to be calculated between vectors.

28. The method of image scaling as described in claim 27, wherein said generating said lower resolution images further comprises:
generating said lower resolution images by block averaging said sample images.

29. The method of image scaling as described in claim 27, wherein said generating said output image further comprises:
selecting an input pixel associated with said input image;
determining an input edge characteristic, from a plurality of predetermined edge characteristics associated with said filter coefficients, of an input window associated with said input pixel;
generating an output window by filtering said input window with a corresponding set of filter coefficients associated with said input edge characteristic; and
generating an output image by repeating said steps of selecting said input pixel, determining said input edge characteristic, and generating said output window for said plurality of input pixels.

30. The method of image scaling as described in claim 27, wherein said plurality of predetermined edge characteristics further comprises:
a first group representing relatively smooth edge transitions;
a second group representing relatively sharp edge transitions; and
a third group representing the absence of an edge.

31. The method of image scaling as described in claim 27, wherein said output window is generated for each color per pixel in said plurality of input pixels.

32. A computer system comprising:
a processor: and
a computer readable memory coupled to said processor and containing program instructions that, when executed, implement a method of image scaling comprising:
selecting an input pixel associated with a first image;
determining an input edge characteristic, from a plurality of predetermined edge characteristics associated with a plurality of sets of filter coefficients, of an input window associated with said input pixel, wherein said input edge characteristic defines an edge angle and an edge sharpness of said input window;
generating an output window by filtering said input window with a corresponding set of filter coefficients based on said input edge characteristic, wherein said output window is scaled by an image scaling factor L over said input pixel; and
generating an output image of a higher resolution than said first image by said image scaling factor L by repeating said steps of selecting said input pixel, determining said input edge characteristic, generating said output window, and generating said output image for a plurality of input pixels associated with said first image without requiring distances to be calculated between vectors.

33. The computer system as described in claim 32, wherein said method further comprises:
determining filter coefficients for said plurality of sets of filter coefficients according to said image scaling factor L, said determining of filter coefficients performed before said selecting said input pixel.

34. The computer system as described in claim 33, wherein said determining filter coefficients in said method comprises:
generating a lower resolution image by said image scaling factor L of a sample image;
creating a plurality of window pairs for pixels in said lower resolution image comprising a lower resolution window of a first dimension equal to said input window, and a higher resolution window of a second dimension equal to said output window;
classifying every window pair as one of said plurality of predetermined edge characteristics; and
for every predetermined edge characteristic, calculating its associated set of predetermined filter coefficients from associated window pairs.

35. The computer system as described in claim 34, wherein said method further comprises:
repeating said steps of generating said lower resolution image, creating said plurality of window pairs, and classifying every window pair for a plurality of sample images, said repeating performed before performing said step of calculating its associated set of predetermined filter coefficients.

36. The computer system as described in claim 32, wherein said generating said output window in said method comprises:
generating an output pixel in said output window by computing the dot product of a first vector of pixels associated with said input window and a corresponding filter coefficient vector associated with said corresponding set of filter coefficients.

37. The computer system as described in claim 32, wherein said steps of selecting said input pixel, determining said input edge characteristic, generating said output window, and generating said output image in said method are performed using integer arithmetic.

38. The computer system as described in claim 32, wherein said determining said input edge characteristic in said method further comprises:
determining an edge angle metric;
determining an edge sharpness metric;
determining said input edge characteristic based on said edge sharpness metric and said edge angle metric.

39. The computer system as described in claim 38, wherein said method further comprises:

determining edge angle coefficients, said determining edge angle coefficients performed before said step of determining said edge angle metric, wherein said edge sharpness metric are based on said angle coefficients.

40. The computer system as described in claim 38, wherein said method further comprises:
determining the absence of an edge when said edge sharpness metric is less than or equal to a first threshold;
determining a smooth edge transition when said edge sharpness metric is less than or equal to a second threshold; and
determining a sharp edge when said edge sharpness metric is greater than said second threshold.

41. The computer system as described in claim 38, wherein said determining said edge angle metric in said method further comprises:
determining edge angle coefficients; and
quantizing said edge angle coefficients into edge angles for determining said edge angle metric.

42. The computer system as described in claim 32, wherein said input window in said method surrounds said input pixel.

43. The computer system as described in claim 32, wherein said output window in said method is of L×L pixel dimension.

* * * * *

UNITED STATES PATENT AND TRADEMARK OFFICE
CERTIFICATE OF CORRECTION

PATENT NO. : 7,149,369 B2  Page 1 of 1
APPLICATION NO. : 10/131691
DATED : December 12, 2006
INVENTOR(S) : C. Brian Atkins It is certified that error appears in the above-identified patent and that said Letters Patent is hereby corrected as shown below:

In column 14, line 44, in Claim 6, after "output" insert -- image --. (second occurrence)

In column 15, line 21, in Claim 13, after "input" delete "pixel and" and insert -- edge --, therefor.

In column 16, line 66, in Claim 26, after "repeating" insert -- said --.

In column 17, line 3, in Claim 26, before "of performing" delete "steps" and insert -- step --, therefor.

In column 17, line 25, in Claim 27, delete "filer" and insert -- filter --, therefor.

In column 19, line 4, in Claim 39, before "sharpness" insert -- angle metric and said edge --.

Signed and Sealed this

Twenty-second Day of December, 2009

David J. Kappos
*Director of the United States Patent and Trademark Office*